June 13, 1950 W. A. SPOFFORD 2,511,677
REVERSIBLE TEMPERATURE CONTROL VALVE
Filed Jan. 16, 1948 2 Sheets-Sheet 1
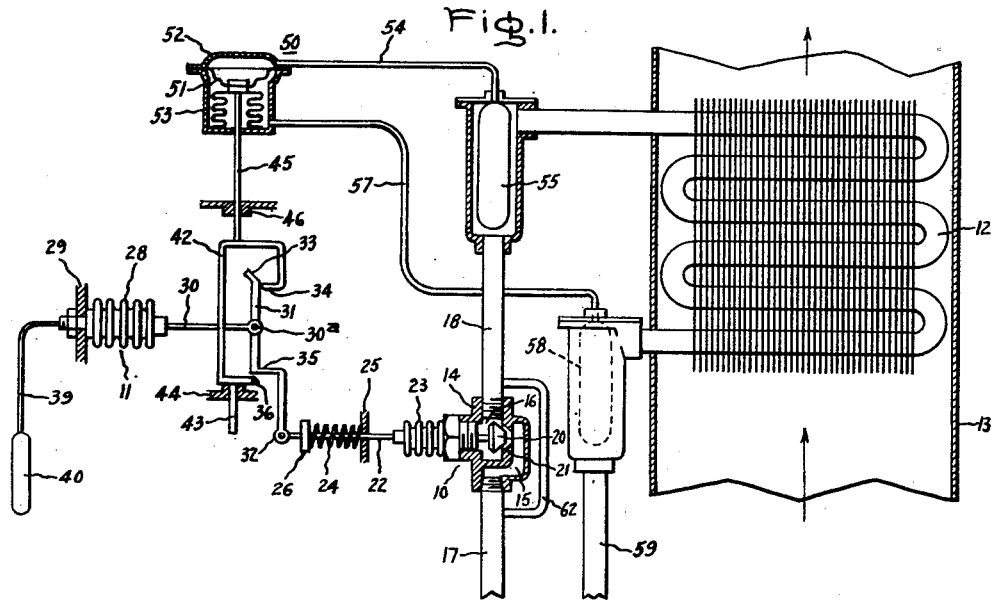
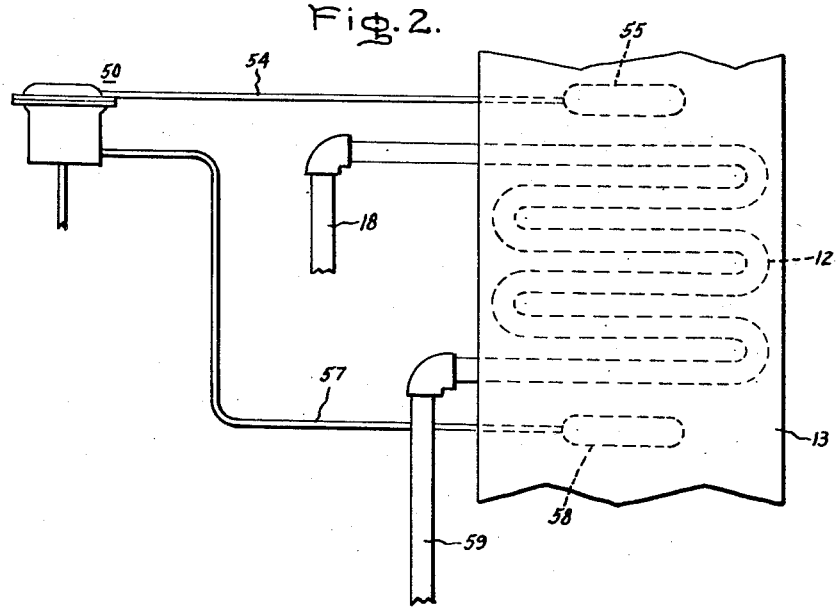
Inventor:
Warren A. Spofford,
by Edwin L. Rich
His Attorney.

June 13, 1950  W. A. SPOFFORD  2,511,677
REVERSIBLE TEMPERATURE CONTROL VALVE
Filed Jan. 16, 1948  2 Sheets-Sheet 2

Inventor:
Warren A. Spofford,
by Edwin L. Rich
His Attorney.

Patented June 13, 1950

2,511,677

UNITED STATES PATENT OFFICE 2,511,677

REVERSIBLE TEMPERATURE CONTROL VALVE

Warren A. Spofford, Glen Ridge, N. J., assignor to General Electric Company, a corporation of New York Application January 16, 1948, Serial No. 2,594

9 Claims. (Cl. 236—1)

1

The invention relates to flow modulation valve systems and particularly to thermostatic valve systems suitable for reversely modulating the flow of heating and cooling medium to a heat exchanger so as to increase the flow of heating medium but decrease of flow of cooling medium upon a decrease in the temperature to be controlled and vice versa.

The Crago Patent 2,121,625 discloses and claims an improved thermostatic heating and cooling medium flow modulating system having a main temperature sensitive control element responsive to the temperature to be controlled and having its thermostatic flow modulation reversed by another temperature sensitive element in response to the temperature values of the heating and cooling medium controlled by the valve. The present invention provides further improvements in such thermostatic flow modulating valve systems.

The principal object is to provide improved differential temperature sensitive means for reversing the thermostatic modulation of the valve controlling the flow of both heating and cooling medium to a heat exchanger in response to inverse differential temperatures appurtenant to reversal of the heat transfer.

In carrying out this object one form of the invention operates on the principle that the incoming-outgoing heating medium temperature differential is the inverse of the incoming-outgoing cooling medium temperature differential due to the reversal of the heat transfer while other forms of the invention utilize a similar principle with respect to the temperature differential of the medium that is heated or cooled by heat transfer from or to the heating or cooling medium.

Another object is to provide improved combinations of differential thermomotive elements responsive to reversal of a heat exchange temperature differential and capable of providing more power and sensitivity in reversing the thermostatic modulation of a valve controlling the flow of both heating and cooling medium.

Figure 3:
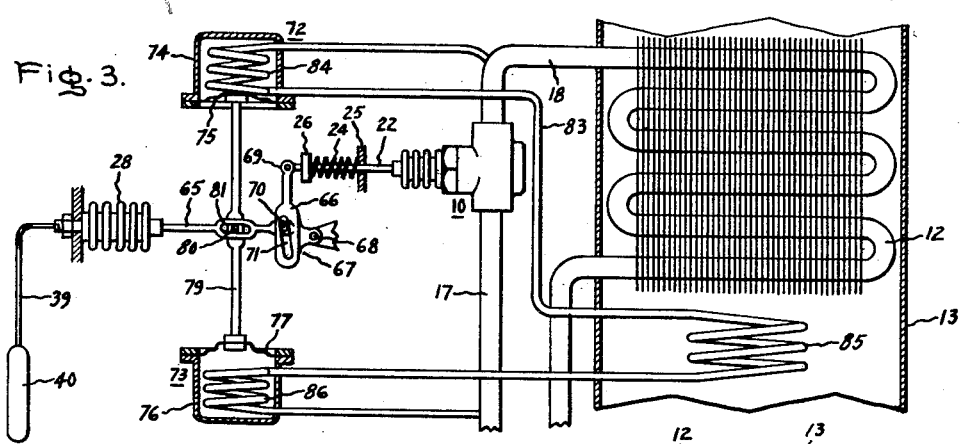
Figure 4:
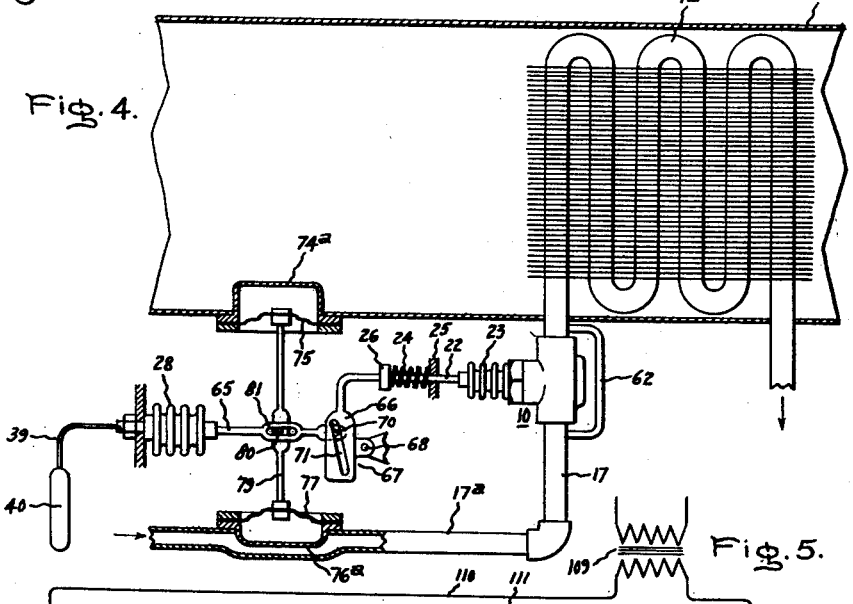

Further objects and advantages of the invention will appear in the following description of the accompanying drawing in which Fig. 1 is a schematic view, partly in section, of reversible thermostatic modulation valve controlling the flow of heat exchange medium to a heat exchanger and embodying the improvements of the present invention; Fig. 2 shows a modified arrangement of the differential temperature responsive elements of the valve system of Fig. 1; Figs. 3 and 4 are similar schematic views of a

Figure 5:
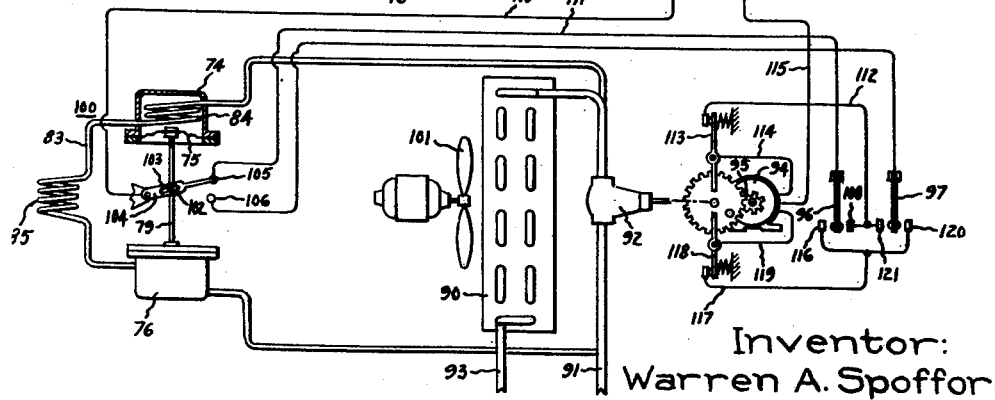

2 different form of reversible thermostatic modulation valve embodying further modifications of the differential temperature responsive reversing means of the present invention; and Fig. 5 is a schematic circuit diagram of an electrically operated reversible thermostatic modulation valve system embodying differential temperature responsive reversing means of the present invention.

In Fig. 1 the flow control valve indicated generally by the reference character 10 is provided with a thermostatic operating mechanism indicated generally by the reference character 11 for modulating the flow of heat exchange medium to the finned tube heat exchanger 12 of a room air conditioning unit preferably having a forced circulation of air thereover through duct 13. The valve 10 has a casing 14 provided with communicating passages 15 and 16 interconnecting the supply pipes 17 and 18 through which heat exchange medium is supplied to the heat exchanger 12. The valve element 20 is relatively movable with respect to the valve seat 21 for modulating the flow of both heating and cooling heat exchange medium. The valve element 20 is carried on the valve stem 22 that is movably sealed to the casing 14 by means of the sealing bellows 23. A spring 24 operating between the abutment 25 and the collar 26 fixed to the valve stem 22 serves to bias the movable valve element 20 away from the valve seat 21.

The modulating control thermostat 11 consists of the expansible bellows 28 having one end fixedly mounted in the support 29 and its free movable end connected by arm 30 with the valve operating lever 31. The arm 30 is shown pivotally connected intermediate the ends of lever 31 so that the fulcrum for the lever 31 may be shifted to either side of the pivotal connection 30a. One end 32 of lever 31 is pivotally connected with the valve stem 22 and the opposite end 33 of lever 31 is bent over as shown to cooperate with the shiftable fulcrum 34 to move the valve element 20 towards the seat 21 against the bias of spring 24 upon expansion of bellows 28. An intermediate step portion 35 of lever 31 cooperates with shiftable fulcrum 36 so as to move the valve member 20 towards seat 21 against the bias of spring 24 when bellows 28 contracts. The bellows 28 is liquid filled and interconnected by the tube 39 with the liquid filled bulb 40 that is responsive to the temperature to be controlled by operation of the heat exchanger 12.

The two shiftable fulcrums 34 and 36 are carried by the frame 42 having a sliding guide 43 in stop 44 and a sliding operating arm 45 in the stop 46. Thus the lever 31 and the shiftable fulcrums 34 and 36 constitute reversible connections or motion reversing mechanism for effecting opposite relative movements between the valve member 20 and the seat 21 upon like variations in the temperature to which bulb 40 is subjected.

In accordance with the present invention, the reversing of the connections or mechanism by shifting the fulcrums 34, 36 is controlled by a differential temperature responsive device indicated generally by the reference character 50 and this differential device is responsive to opposite temperature changes appurtenant to the heat exchange of the medium controlled by the valve 10. In the form shown in Fig. 1, the differential temperature responsive device 50 comprises a flexible diaphragm 51 clamped between the opposing casings 52 and 53 with the casing 52 connected by tube 54 with the bulb 55 containing a suitable volatile liquid disposed inside the heat exchange medium supply pipe 18 to be responsive to the temperature of the incoming medium supplied to the heat exchanger 12. Likewise, the casing 53 is connected by the tube 57 with the bulb 58 containing a suitable volatile liquid disposed in the outlet pipe 59 to be responsive to the temperature of the outgoing medium from the exchanger 12. The pair of bulbs 55 and 58 are each charged with a suitable volatilizable liquid such as "Freon-12" and the diaphragm 51 is connected to operate the rod 45 in response to the differential vapor pressure exerted thereon with the flexible bellows 61 sealing the opening in casing 53 through which rod 45 extends. A small by-pass 62 around the valve 10 serves to keep bulb 55 either heated or cooled even though valve member 20 is closed on seat 21 and thus maintains a temperature differential with respect to bulb 58.

Operation of Fig. 1

When heating medium, such for example as hot water, is supplied to the heat exchanger 12 under the control of valve 10 to heat the room to the desired temperatures to which bulb 40 is responsive, then the temperature of the incoming water supplied to the heat exchanger 12 necessarily will be higher than the temperature of the outgoing water from the heat exchanger 12, due to the transfer of heat therefrom. As a result, bulb 55 will produce a greater vapor pressure inside casing 52 than the pressure produced by bulb 58 inside casing 53. Hence diaphragm 51 will be moved downwardly by the pressure differential so as to shift the fulcrum 36 away from the step 35 and into engagement with stop 44 and bring fulcrum 34 into cooperating relation with the end 33 of the valve operating lever 31. Thus under heating conditions, an increase in the room temperature will cause bulb 40 to expand bellows 28 and thereby move lever 31 about fulcrum 34 to operate valve member 20 towards seat 21 against the bias of spring 24, and thereby decrease the flow of heat exchange medium to the heat exchanger 12. Conversely, if the room temperature decreases, then bellows 28 will contract and thus permit spring 24 to move valve 20 away from seat 21 and thereby increase the flow of heating medium to the heat exchanger 12. In this way the bulb 40 and bellows 28 act as a thermostat to regulate the flow of heating medium supplied to the heat exchanger 12 so as to balance the heat loss from the room and maintain the desired temperatures in the room.

When cooling medium is supplied to the heat exchanger 12 under the control of valve 10, then the temperature of the incoming medium necessarily will be lower than the temperature of the outgoing medium due to the heat gain. Consequently, under cooling conditions bulb 58 will produce a higher vapor pressure in casing 53 than bulb 55 will produce in casing 52. The reversal of the pressure differential will flex diaphragm 51 upwardly and thereby move frame 42 into engagement with stop 46 and thus shift fulcrum 34 out of cooperating relation with the lever 31 and move fulcrum 36 into cooperating relation with the intermediate step portion 35 of the lever 31. Hence under cooling conditions expansion of bellows 28 in response to increasing room temperatures will permit spring 24 to move valve member 20 away from seat 21 and thereby increase the flow of cooling medium to the heat exchanger 12. Conversely, when the room temperature decreases, the resulting contraction of bellows 28 will operate lever 31 about fulcrum 36 to move valve member 20 towards seat 21 against the bias of spring 24 and thereby reduce the flow of cooling medium to the heat exchanger 12. In this way bellows 28 will vary the position of the valve 20 so as to modulate the flow of cooling medium to balance the heat gain of the room and thus maintain desired room temperatures.

By suitably locating and dimensioning the shiftable fulcrums 34, 36 with respect to the valve operating lever 31 so that bellows 28 must expand more to open valve 20 when fulcrum 36 is active than when fulcrum 34 is active, the heating range of control may be separated from and lower than the cooling range of control of bellows 28 and bulb 40 if desired. Also if desired the diaphragm 51 may be located in a vertical plane above the level of the bulbs 55 and 38 so that any condensate accumulated inside of the casings 52 and 53 can readily drain through the tubes 54 and 57 into the bulbs 55 and 58.

Operation of Fig. 2

In the modified form of the invention shown in Fig. 2, all parts are the same as shown in Fig. 1 except that the two differential temperature responsive bulbs 55 and 58 are located on opposite sides of the heat exchanger 12 in the path of the air stream passing through the duct 13. Thus, bulb 55 is responsive to the temperature of the outgoing air while bulb 58 is responsive to the temperature of the incoming air. Hence the operation of Fig. 2 is substantially the same as Fig. 1 except that temperature differential of the air produced by the heating or cooling thereof by the heat exchanger 12 serves to operate the differential temperature responsive device 50 and thereby cause reversal of the modulation action of the bellows 28 having the room temperature responsive bulb 40.

When the heating medium is applied to the heat exchanger 12, bulb 55 will respond to the increased temperature of the air while bulb 58 will respond to the incoming air temperature and thereby produce a movement of the frame 42 so as to interconnect the room temperature responsive bulb 40 and bellows 28 for proper modulation of the flow of the heating medium. However, when cooling medium is supplied to the heat exchanger 12, bulb 55 will respond to the decrease in temperature of the room air produced during its passage over the heat exchanger 12 and thereby produce an opposite movement of the frame 42 so as to reverse the operating connections of the room temperature responsive bulb 40 and bellows 28.

In the modified form of the invention shown in Fig. 3, the valve 10 and heat exchanger 12 may be of the same construction as shown in Fig. 1. However, in this case, the free end of bellows 28 is connected by arm 65 with the pivoted valve operating lever 66 through the over-center pin and slot motion reversing connections 67. The lever 66 is centrally pivoted to tilt about the fixed pivot 68 with its upper end 69 pivotally connected to the valve operating stem 22. When the pin 70 carried by arm 65 is in the upper end of the slot 71, then expansion of bellows 28 will produce a clockwise movement of lever 66 so as to tend to close the valve 10 against the bias of spring 24. However, when pin 70 is in the lower end of slot 71, then contraction of bellows 28 will tend to produce the same result.

In accordance with the present invention, the motion reversing movement of pin 70 between the opposite ends of slot 71 is controlled by a pair of thermally isolated opposing differential temperature responsive devices indicated generally by the reference characters 72 and 73. The casing 74 of device 72 is provided with a flexible diaphragm 75 and charged with a suitable volatile liquid and the casing 76 of device 73 is provided with an opposing flexible diaphragm 77 and charged with a suitable volatile liquid. The pair of opposing diaphragms 76 and 77 are interconnected by the arm 79 carrying the pin 80 in the slot 81 formed in arm 65. Thus the differential force provided when one pressure diaphragm predominates over the other will serve to raise or lower arm 65 and thereby move pin 70 between the opposite ends of slot 71 so as to reverse the operating connections of bellows 28 with the valve 10 to produce opposite movements of the valve upon like variations in temperature.

An auxiliary or by-pass flow loop for heat exchange medium indicated generally by the reference character 83 is provided around the valve 10 for varying the temperatures inside the casings 74 and 76 differentially upon reversal of the heat exchange action in the heat exchanger 12. As shown, the loop 83 consists of the coil 84 inside the casing 74, the auxiliary heat exchanger 85 located in the stream of air passing over the heat exchanger 12 and the coil 86 inside the casing 76 all connected in series so as to provide a small but continuous flow of heat exchange medium from pipe 17 around valve 10 to pipe 18. Thus when heating medium is supplied to the heat exchanger 12 under control of valve 10, coil 86 will be at a higher temperature than coil 84 due to the heat loss from the medium in the auxiliary heat exchanger 85. As a result, the vapor pressure produced inside casing 76 will be greater than the vapor pressure produced inside casing 74, thus causing diaphragm 77 to overpower diaphragm 75 and thereby raise pin 80 and arm 65 to position pin 70 in the upper end of slot 71. Under these conditions, an increase in the temperature of the room will cause bellows 28 to expand and thereby rotate lever 66 in a clockwise direction to move valve 10 towards the closed position and reduce the supply of heating medium to the heat exchanger 12. Conversely a decrease in the room temperature will cause bellows 28 to contract and thereby rotate lever 66 in the counterclockwise direction to enable spring 24 to open valve 10 and increase the supply of heating medium to the heat exchanger 12. Thus the bellows 28 will operate valve 10 to modulate the flow of heating medium to meet the heating demands of the room upon variation of the room temperature within a predetermined heating control range.

*Operation of Fig. 3*

When cooling medium is supplied to the heat exchanger 12 under the control of valve 10, a small part of the cooling medium will flow through the auxiliary or by-pass flow loop 83 and coil 86 will be at a lower temperature than coil 84 due to the heat gain of the medium in the auxiliary heat exchanger 85. As a result, the vapor pressure produced inside casing 76 will be lower than the vapor pressure produced inside casing 74. This causes diaphragm 75 to overpower diaphragm 77 and thereby lower pin 80 and arm 65 so as to position pin 70 in the lower end of slot 71. Thus under cooling conditions, an increase in the temperature of the room into a cooling temperature control range will cause bellows 28 to expand and thereby enable spring 24 to open valve 10 and increase the flow of cooling medium to the heat exchanger 12. A decrease in the room temperature will cause bellows 28 to contract and thereby tilt lever 66 in the clockwise direction to close valve 10 against the bias of spring 24 and reduce the supply of cooling medium to the heat exchanger 12. Thus bellows 28 will operate valve 10 to modulate the flow of cooling medium to the heat exchanger 12 so as to meet the cooling demands of the room upon variation of the room temperatures in the cooling range.

The cooling control range is separate from and higher than the heating control range due to the angular slope of the slot 71 in the valve operating lever 66. This provides for a greater expansion of bellows 28 when pin 70 is in the lower end of the slot than when pin 70 is in the upper end of slot 71. Hence the room temperature must rise from the heating range to the cooling range to produce sufficient expansion of bellows 28 to open the valve 10 when pin 70 is in the lower end of slot 71.

*Operation of Fig. 4*

In the modified form of the invention shown in Fig. 4, all parts are the same as shown in Fig. 3 except that casing 74a is located inside the air duct 13 so as to operate diaphragm 75 responsively to the temperature of the incoming air and casing 76a is located in the supply pipe 17a for the heat exchange medium so as to supply diaphragm 77 responsively to the temperature of the heating or cooling medium supplied through 17a. In this case reversal of the modulating action of the room temperature responsive bulb 40 and bellows 28 is accomplished by the temperature differential between the casings 74a and 76a. When heating medium is supplied through pipe 17a, casing 76a will be heated while the relatively cooler room air will pass over casing 74a. Under these conditions arm 65 will be moved upwardly to position pin 70 in the upper end of slot 71 to provide flow modulation of the heating medium in substantially the same way as described in connection with Fig. 3. When cooling medium is supplied through pipe 17a, casing 76a will be cooling while the relatively hot room air will heat casing 74a. Under these conditions arm 65 will position pin 70 in the lower end of slot 71 thereby providing for flow modulation of the heating medium in substantially the same way as described in connection with Fig. 3.

Thus a much larger temperature differential between casing 74a and 76a is obtained in the modified form of the invention shown in Fig. 4 than in the heating and cooling medium loop arrangement of Fig. 3. Consequently, more powerful and accurate operation of the modulation reversal mechanism may be obtained.

Thus, it will be seen that the improved differential temperature responsive valve operating means of the present invention has the following characteristic advantages.

(1) The differential temperature responsive mechanism senses whether the heat exchange medium is delivering heat to or absorbing heat from the heat exchanger regardless of the actual temperature of the medium passing to or over the heat exchanger. Hence the differential temperature responsive mechanism does not have to wait until the medium has attained a predetermined temperature before it functions properly.

(2) A small change in heat exchange medium temperature is sufficient to set the differential temperature responsive valve reversing mechanism in proper position. In case a volatile refrigerant such as Freon-12 is used to actuate the temperature responsive diaphragms, a vapor pressure difference across the diaphragm of about 1 pound p. s. i. exists for each degree of temperature difference. Since a temperature difference of 8° for cooling and 20° for heating is typical, it will be seen that ample operating forces can be obtained with a relatively small diaphragm or bellows. Furthermore, when the flow of heat exchange medium is throttled, the heat exchange temperature change thereof tends to increase, thereby providing greater forces to keep the reversing mechanism in proper position.

(3) Since the differential temperature responsive reversing mechanism can be operated by vapor pressure of a volatile liquid rather than by expansion of a temperature sensitive element, it becomes unnecessary to introduce any over-travel mechanism to allow for excessive temperatures.

(4) When vapor pressure is used instead of a positive expansion device, considerable motion of the diaphragm (or bellows) is readily obtained as may be needed to operate the valve motion reversing mechanism.

(5) The differential temperature sensitive elements of the valve reversing mechanism can be kept out of the heat exchange medium flow passages as the chambers containing the volatile liquid need only be in thermal contact with the conduits and these involve no moving or delicate parts and may even be clamped on the flow pipes externally if desired.

Fig. 5 shows the present invention embodied in a heating and cooling reversible thermostatic modulation system similar to that disclosed in the Crago Patent 2,121,625. When the heat exchanger 90 is supplied with heat exchange medium through the pipe 91, the flow of the medium is controlled by the valve 92 in the return pipe 93. Valve 92 is operated by the reversible electric motor 94 through suitable speed reducing gearing 95 and the reverse operations of motor 94 are under the control of a selected one of the two room temperature responsive thermostats 96, 97 as determined by the improved heat exchange differential temperature responsive selective change-over device indicated generally by the reference character 100 and embodying the improvements of the present invention. The selective change-over device 100 has the pair of differential temperature responsive elements 74 and 76 with opposing flexible operating diaphragms 75 and 77 interconnected by the operating arm 79 of substantially the same construction as shown and described in connection with Fig. 3. Likewise, the auxiliary or by-pass flow loop for heat exchange medium indicated by the reference character 83 is provided around the valve 92 for varying the temperatures inside the element casings 74 and 76 differentially upon reversal of the heat exchange action in the auxiliary heat exchanger 85. The loop 83 includes the coils 84 and 86 inside the casing 74 and 76 and the auxiliary heat exchanger 85 preferably located between the continuously operating air circulating fan 101 and the main heat exchanger 90.

The pin 102 carried by the operating arm 79 slides in the slot 103 formed in the pivotally mounted selective switch 104 to operate this switch between the change-over contacts 105 and 106.

Operation of Fig. 5

With switch 104 engaging contact 105 as shown, heating medium is being supplied to the heat exchanger 90. Thus heating medium will flow through the by-pass loop 83 from the supply pipe 91 so as to raise the temperature inside casing 76 higher than the temperature inside casing 74 due to the heat loss and consequent reduction in temperature of the heating medium in the auxiliary heat exchanger 85. As a result diaphragm 77 overpowers diaphragm 75 and moves switch 104 into engagement with contact 105 to render room thermostat 96 effective to control the reversing operation of motor 94.

When the room temperature increases, the heating control thermostat 96 engages its right hand contact 108, and establishes an energizing circuit for motor 94 extending from the secondary of transformer 109 through conductor 110, switch arm 104, contact 105, conductor 111, the blade of room thermostat 96, contact 108, conductor 112, limit switch 113, conductor 114, the forward windings of motor 94 and conductor 115 to the other side of the transformer low voltage winding. Hence motor 94 runs in the forward direction and operates the gearing 95 to move valve 92 towards the closed position and thereby reduce the supply of heating medium to the heat exchanger 90 so as to balance the room heating demands.

When the room temperature falls below the desired value, the heating control thermostat 96 will respond to engage with contact 116. This will establish the reverse energizing circuit for operating motor 94 in the reverse direction, the circuit extending from the secondary of transformer 109 through conductor 110, switch arm 104, contact 105, conductor 111, the blade of room thermostat 96, contact 116, conductor 117, limit switch 118, conductor 119 and the reverse windings of motor 94 and conductor 115 to the other side of the transformer secondary winding. The resulting operation of motor 94 in the reverse direction will operate gearing 95 to move valve 92 away from the closed position. As a result, the supply of heating medium to heat exchanger 90 will be increased to balance the room heating demands.

When conditions are such that cooling of the room is required, cooling medium is circulated to the heat exchanger 90 through the supply pipe 91. The resulting small flow of cooling medium through the auxiliary loop 83 will produce a lower temperature inside casing 76 than inside casing 74 due to the heat gain of the medium in the auxiliary heat exchanger 85. Under these conditions, the pressure differential exerted on the diaphragm 75 and 77 will become reversed and arm 79 will operate pin 102 to disengage the selective switch arm 104 from contact 105 and move the switch arm 104 into engagement with contact 106. This renders the cooling control room temperature responsive thrermostat 97 effective to control the reversing operation of motor 94.

Thus under cooling conditions, the cooling control thermostat 97 will respond to an increase in temperature to engage with contact 120 to establish the reverse energizing circuit for motor 94 and thereby operate gearing 95 to move valve 92 away from the closed position and thereby increase the supply of cooling medium to the heat exchanger 90 to balance the room cooling demand. Conversely a decrease in the room temperature will cause cooling control thermostat 97 to engage with contact 121 to establish the forward energizing circuit for motor 95 and thus operate gearing 95 to move valve 92 towards the closed position with a resulting decrease in the supply of cooling medium to heat exchanger 90.

In this way the improved differential heat exchange temperature responsive devices 74 and 76 operate to position the selective switch 104 in accordance with the heat loss or heat gain of the medium occurring in the auxiliary heat exchanger 85 so as to render one or the other of the two thermostats 96, 97 effective. The small but continuous flow of heat exchange medium through the loop 83 serves to maintain the temperature differential between the temperature responsive differential devices 74 and 76 irrespective of whether the valve 92 is closed or partially open.

What I claim as new and desire to secure by Letters Patent of the United States is:

1. A reversible thermostatic flow modulation valve having in combination, a valve casing having communicating flow passages provided with relatively movable valve members for modulating the flow of a heat exchange medium having its direction of heat exchange reversible with respect to another medium, thermostatic control means having reversing connections for effecting opposite relative movements of said members upon like changes in a temperature condition under control of said other medium, and differential temperature responsive means including a pair of opposed temperature responsive elements and dependent upon the reversal of the direction of the heat exchange between said mediums for correspondingly reversing said connections.

2. A reversible thermostatic flow modulation valve having in combination, a valve casing having communicating flow passages provided with relatively movable valve members for modulating the flow of a heat exchange medium for heating and cooling another medium, thermomotive means having motion reversing mechanism for effecting opposite relative movements of said members upon like changes in a temperature condition dependent upon said other medium and means including a pair of temperature responsive elements and dependent upon the reversal of the direction of heat exchange between said mediums for correspondingly reversing said mechanism.

3. A reversible thermostatic flow modulation valve having in combination, a casing having communicating flow passages provided with relatively movable valve members for modulating the flow of a heat exchange medium for heating and cooling another medium, thermomotive means having motion reversing mechanism for effecting opposite relative movements of said members upon like changes in a temperature condition dependent upon said other medium, and opposing temperature responsive vapor pressure means dependent upon the reversal of the direction of heat exchange between said mediums for correspondingly reversing said mechanism.

4. A reversible thermostatic flow modulation valve having in combination, a valve casing having a flow passage and a movable valve member for modulating the flow of heating and cooling medium through said passage, thermostatic control means having reversing connections for effecting opposite movement of said valve member upon like changes in a temperature condition under control of said medium, and opposing vapor pressure thermomotive means jointly dependent upon the reversal of the direction of heat exchange with respect to said medium and having a control member movable in opposite directions thereby for reversing said connections.

5. A reversible thermostatic flow modulation valve having in combination, a valve casing having a flow passage, a valve member movably mounted in said casing for modulating the flow of a heating and cooling medium through said passage, thermostatic control means having reversing connections for effecting opposite movement of said valve member upon like changes in a temperature condition under control of said medium, and means for reversing said connections including a pair of interconnected oppositely-acting vapor pressure actuated devices jointly dependent upon reversal of the direction of heat exchange with respect to said medium.

6. A reversible thermostatic flow modulation valve having in combination, a valve casing having a flow passage and a movable valve member for modulating the flow of reversible heat exchange medium through said passages, thermomotive means having reversing pivotal connections for effecting opposite movement of said valve member upon like changes in a temperature condition under control of said medium, and a thermomotive device having a diaphragm provided with connections for controlling said reversing pivotal connections and a pair of vapor pressure bulbs jointly dependent upon the reversal of the direction of heat exchange with respect to said medium and connected on opposite sides of said diaphragm for reversing said pivotal connections.

7. A reversible thermostatic flow modulation valve having in combination a valve casing having a flow passage provided with a movable valve member for modulating the flow of a heat exchange medium having reversible direction of heat exchange with another medium, thermostatic control means having reversing connections for effecting opposite movements of said member upon like changes in a temperature condition under control of said other medium, and means including a pair of interconnecting temperature responsive elements, each separately responsive to temperature changes of a corresponding one of said mediums dependent upon the reversal of the direction of heat exchange between said mediums for correspondingly reversing said connections.

8. A reversible thermostatic flow modulation valve having in combination a valve casing having a flow passage and a movable valve member for modulating the flow of a heating and cooling medium through said passage, thermostatic control means having reversing connections for effecting opposite movement of said valve member upon like changes in a temperature condition dependent upon heat exchange with said medium, and a vapor pressure device for controlling said connections having a pair of vapor pressure generating bulbs connected therewith and differentially responsive to the temperatures of said medium before and after heat exchange thereof for reversing said connections in response to reversal of the direction of heat exchange with respect to said medium.

9. A reversible thermostatic flow modulation valve having in combination a valve casing having a flow passage provided with a movable valve member for modulating the flow of a heat exchange medium having reversible direction of heat exchange with another medium, thermostatic control means having reversing connections for effecting opposite movements of said valve member upon like changes in a temperature condition under control of said other medium, a pair of opposing vapor pressure temperature responsive devices for controlling the reversal of said connections, and means for differentially varying the temperatures of said devices including a by-pass flow loop for said medium around said valve having a central heat exchanger connected therein in heat exchange relation with said other medium and a heat exchanger connected therein on each side of said central heat exchanger in heat exchange relation with a corresponding one of said devices.

WARREN A. SPOFFORD.

REFERENCES CITED

The following references are of record in the file of this patent:

UNITED STATES PATENTS

| Number | Name | Date |
|---|---|---|
| 2,222,153 | Newton | Nov. 19, 1940 |
| 2,285,513 | Harris | June 9, 1942 |
| 2,310,293 | Joesting | Feb. 9, 1943 |